United States Patent
Berger

(10) Patent No.: US 12,028,691 B2
(45) Date of Patent: Jul. 2, 2024

(54) METHOD OF APPLYING A SET OF EQUALIZATION PARAMETERS

(71) Applicant: SAGEMCOM BROADBAND SAS, Rueil Malmaison (FR)

(72) Inventor: Jérôme Berger, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 215 days.

(21) Appl. No.: 17/219,226

(22) Filed: Mar. 31, 2021

(65) Prior Publication Data

US 2021/0314703 A1 Oct. 7, 2021

(30) Foreign Application Priority Data

Apr. 1, 2020 (FR) ...................................... 2003262

(51) Int. Cl.
*H04R 3/12* (2006.01)
*G06F 3/16* (2006.01)

(52) U.S. Cl.
CPC .............. *H04R 3/12* (2013.01); *G06F 3/165* (2013.01); *H04R 2430/01* (2013.01)

(58) Field of Classification Search
None
See application file for complete search history.

(56) References Cited

U.S. PATENT DOCUMENTS

| | | | |
|---|---|---|---|
| 8,234,395 B2 * | 7/2012 | Millington | G06F 3/16 709/248 |
| 2014/0003625 A1 | 1/2014 | Sheen et al. | |
| 2016/0357503 A1 * | 12/2016 | Triplett | H04R 3/12 |
| 2023/0074658 A1 * | 3/2023 | Sereshki | H04R 3/005 |

FOREIGN PATENT DOCUMENTS

| | | |
|---|---|---|
| EP | 1398931 A1 | 3/2004 |
| WO | WO2016/196058 A1 | 12/2016 |

\* cited by examiner

*Primary Examiner* — Paul W Huber
(74) *Attorney, Agent, or Firm* — Muncy, Geissler, Olds & Lowe, P.C.

(57) ABSTRACT

A method including a device of an installation performing steps to determine whether an audio stream is played back in the installation by only one piece of audio playback equipment or by a group of at least two pieces of audio playback equipment (11a, 11b); if the device detects that the audio stream is played back by a single piece of audio playback equipment, then the device generates an order for said piece of equipment to apply a given set of equalization parameters; and if the device detects that the audio stream is played back by a group of at least two pieces of audio playback equipment, then the device determines the equalization parameters to be applied by each piece of audio playback equipment of said group, and generates a respective order for each piece of audio playback equipment of said group to apply a respective given set of equalization parameters.

18 Claims, 4 Drawing Sheets

```
{
    "jsonrpc": "2.0",
    "method": "audio.network.send",
    "params": {
        "targets": [
            { "address": "192.168.0.10", "port": 11111 },
            { "address": "192.168.0.11", "port": 11111 },
        ]
    },
    "id": 310
}
```

```
{
    "jsonrpc": "2.0",
    "result": {
        "synchronisation": {
            "ref_ntp_time": 123654789,
            "ref_rtp_timestamp": 0,
            "rtp_clock_rate": 48000
        }
    },
    "id": 310
}
```

```
{
    "jsonrpc": "2.0",
    "method": "audio.network.receive",
    "params": {
        "ntp_server": "192.168.0.12:1234",
        "ref_ntp_time": 123654789,
        "ref_rtp_timestamp": 0,
        "rtp_clock_rate": 48000
    },
    "id": 320
}
```

```
{
    "jsonrpc": "2.0",
    "method": "audio.set_equalization",
    "params": {
        "bass_gain_db": -20,
        "mid_gain_db": 0,
        "treble_gain_db": 0
    },
    "id": 330
}
```

METHOD OF APPLYING A SET OF EQUALIZATION PARAMETERS

The invention relates to the field of audio playback via one or more pieces of playback equipment.

BACKGROUND OF THE INVENTION

In modern multimedia installations for the home, it is nowadays very common to connect decoder equipment, of the set-top box (STB) type, to one or more pieces of audio playback equipment.

Specifically, the pieces of audio playback equipment can thus be grouped together so as to be able to play the same audio stream simultaneously, thereby improving the listening experience of the user. For example, two pieces of audio playback equipment may be arranged in two different rooms in a home, with the audio stream being played simultaneously by said pieces of equipment then enabling the user to move between those two rooms without interruption to listening.

It is even possible to cause different pieces of audio playback equipment in a single group to play a single audio stream in different manners by requiring those pieces to play back the audio stream with different sets of equalization parameters. By way of example, this makes it possible to emphasize the bass on one of the pieces of audio playback equipment, so as to cause it to act as a woofer.

OBJECT OF THE INVENTION

An object of the invention is to propose a method of facilitating the application of at least one set of equalization parameters by at least one piece of audio playback equipment.

SUMMARY OF THE INVENTION

In order to achieve this object, the invention proposes an installation comprising a device and at least one piece of audio playback equipment, the device being configured to determine whether an audio stream is played back in the installation by only one piece of audio playback equipment or by a group of at least two pieces of audio playback equipment, the device being distinct from said pieces of audio playback equipment, the device also being configured:
if the device detects that the audio stream is played back by a single piece of audio playback equipment, to generate an order for said piece of equipment to apply a given set of equalization parameters;
if the device detects that the audio stream is played back by a group of at least two pieces of audio playback equipment, to determine the equalization parameters to be applied by each piece of audio playback equipment of said group, and to generate a respective order for each piece of audio playback equipment of said group to apply a respective given set of equalization parameters.

As a result, the invention has recourse to a device that is distinct from the pieces of audio playback equipment to order the application of one or more sets of parameters, in particular for the purpose of determining whether two pieces of audio playback equipment in the same group are to apply the same set of equalization parameters or are to apply different sets.

Advantageously, there is no need for the user to determine personally which equalization parameters are to be applied.

Optionally, the installation comprises an audio source configured for sending the audio stream to one of the pieces of audio playback equipment and/or to a mobile appliance that is mobile relative to the pieces of audio playback equipment.

Optionally, the device is the audio source and/or the mobile appliance.

Optionally, audio source is distinct from the device, the device controlling simultaneously the audio source and the piece(s) of audio playback equipment of the installation.

Optionally, when the installation includes the audio source, the audio source is distinct from the pieces of audio playback equipment of the installation, and when the installation includes the appliance, the appliance is distinct from the pieces of audio playback equipment of the installation.

Optionally, the appliance is a mobile telephone or a tablet.

The invention also provides a method of applying at least one set of equalization parameters, performed by an installation as specified above.

Optionally, the method includes a synchronization step for synchronizing playback of the audio stream on a reference clock.

Optionally, the synchronization step is performed by means of synchronization data.

Optionally, the audio stream is split up into packets and the header of each packet includes timestamp information, the synchronization data being correspondence information about the correspondence between at least said timestamp information and the reference clock.

Optionally, the device contributes to synchronizing the playback of the audio stream on a reference clock.

Optionally, the device orders one or more of the pieces of audio playback equipment to play the audio stream in a manner that is synchronized on the reference clock.

Optionally, the order to play the audio stream in a manner that is synchronized on the reference clock is transmitted via a second message that is different from the first message containing the order to apply a given set of equalization parameters.

Optionally, once the order to play the audio stream in a manner that is synchronized on the reference clock has been transmitted, the piece(s) of audio playback equipment deliver at least one network time protocol (NTP) request to an audio source of the installation.

Optionally, the piece(s) of audio playback equipment deliver(s) at least one NTP request to the audio source in regular manner.

Optionally, if the audio stream is played by a group of at least two pieces of audio playback equipment, the device causes a set of different parameters to be applied by each piece of audio playback equipment in the group.

The invention also provides an installation for performing the method as specified above.

The invention also provides a computer program including instructions that cause a device to execute the method as specified above.

The invention also provides a computer readable storage medium storing the computer program as specified above.

Other characteristics and advantages of the invention appear on reading the following description of particular, nonlimiting implementations of the invention.

BRIEF DESCRIPTION OF THE DRAWINGS

The invention can be better understood in the light of the following description given with reference to the accompanying figures, in which:

as shown in FIG. 5;

DETAILED DESCRIPTION OF THE INVENTION

Figure 1:
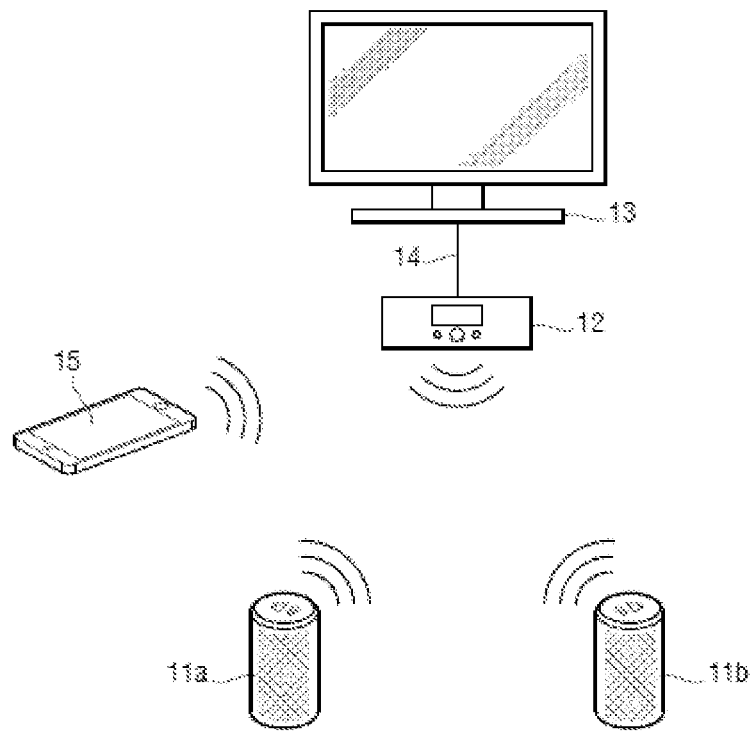
FIG. 1 is a diagram showing an installation enabling the invention to be implemented.

With reference to FIG. 1, there follows a description of an example of an installation capable of implementing the invention.

The installation is a multimedia installation comprising decoder equipment 12 that is connected in this example to video playback equipment, in reality in this example both a piece of audio/video playback equipment 13, and also to at least one piece of audio playback equipment. In this example, the decoder equipment 12 acts as an audio source equipment for two pieces of audio playback equipment 11a and 11b. In the present example, the pieces of audio playback equipment 11a and 11b are distinct both from the decoder equipment 12 and also from the audio/video playback equipment 13.

Furthermore, the installation also includes an appliance 15 for controlling at least the pieces of audio playback equipment 11a and 11b, preferably for controlling at least the pieces of audio playback equipment 11a and 11b and the decoder equipment 12, and more preferably for controlling the entire installation. In the present example, the appliance 15 is distinct not only from the decoder equipment 12, but also from the audio/video playback equipment 13 and from each of the pieces of audio playback equipment 11a and 11b.

In this example, the decoder equipment 12 is a decoder box, the audio/video playback equipment 13 is a television set, and the pieces of audio playback equipment 11a and 11b are external loudspeakers connected to said decoder box. In this example, the appliance 15 is a smartphone or indeed a tablet, the telephone or the tablet including means for storing an application dedicated at least to controlling the decoder equipment 12 and the pieces of audio playback equipment 11a and 11b, such that executing this application enables at least the decoder equipment 12 and the pieces of audio playback equipment 11a and 11b to be controlled.

In service, the decoder equipment 12 acquires an audio/video multimedia stream from a communication interface of the decoder equipment 12, which stream may come from one or more broadcast networks. The broadcast networks may be of any type. For example, the broadcast network is a satellite television network, and the decoder equipment 12 receives an incoming audio/video stream via a parabolic antenna. In a variant, the broadcast network is an Internet connection and the decoder equipment 12 receives the incoming audio/video stream via said Internet connection. In another variant, the broadcast network is a digital terrestrial television (DTT) network or a cable television network. Overall, the broadcast network may be a variety of sources: satellite, cable, Internet protocol (IP), DTT, a locally stored audio/video stream, etc.

The decoder equipment 12 includes processor means serving, amongst other things, to process the incoming audio/video stream.

Furthermore the audio/video playback equipment 13 is connected to an audio/video output of the decoder equipment 12, and each piece of audio playback equipment 11a and 11b is connected to an output of the decoder equipment 12.

The term "audio/video output" is used to mean an output on which the decoder equipment 12 applies at least one audio/video signal in order to perform both audio playback and also video playback via (at least) one piece of audio/video playback equipment 13 (specifically the television set). The term "audio output" is used to mean an output on which the decoder equipment 12 applies at least one audio signal in order to perform audio playback via (at least) one piece of audio playback equipment 11a, 11b (specifically the external loudspeaker). Consequently, each piece of audio playback equipment 11a and 11b includes processor means of its own for processing the audio stream delivered by the decoder equipment 12.

Furthermore, as mentioned, the apparatus 15 serves to send orders to the decoder equipment 12 and to the pieces of audio playback equipment 11a and 11b, thereby enabling the user to manage the installation via the appliance 15, e.g. via a graphics control interface of the appliance 15, such as a touchscreen of the appliance 15.

Optionally, the appliance 15 communicates with the audio playback equipment 11a, 11b and/or with the decoder equipment 12 using a control protocol such as JSON-RPC or CORBA. The control protocol enables the appliance 15 both to receive information from the audio playback equipment 11a, 11b and from the decoder equipment 12, and also to send them instructions.

Typically, the user can send an order to the decoder equipment 12 via the appliance 15 so that the decoder equipment 12 sends an audio stream to only one of the pieces of audio playback equipment 11a (the audio playback equipment 11a then being isolated). The user can also use the appliance 15 to send an order to the decoder equipment 12 so that it sends an audio stream and synchronization information to the at least two pieces of audio playback equipment 11a and 11b simultaneously; under such circumstances, the decoder equipment 12 can send different channels to the different pieces of audio playback equipment 11a, 11b (which together then form an audio playback equipment group). For example, with a stereo audio stream having two channels, the decoder equipment 12 can send the left channel to one of the pieces of audio playback equipment 11a and the right channel to another one of the pieces of audio playback equipment 11b.

It should be understood that it is assumed in this example that the pieces of audio playback equipment 11a and 11b retranscribing the same audio stream belong to the same group, and that each piece of audio playback equipment 11a and 11b retranscribes the stream in full or in part by playing only one of the channels of said stream (e.g. for a stereo stream).

Depending on the configurations requested by the user, the grouping of the pieces of audio playback equipment 11a, 11b may thus vary over time.

In order to provide synchronization between the pieces of audio playback equipment 11a and 11b of the installation and/or between a plurality of (audio and/or video) streams passing through the installation, synchronization data is exchanged at least between the decoder equipment 12 and the pieces of audio playback equipment 11a and 11b and also between the decoder equipment 12 and the audio/video playback equipment 13.

In a particular embodiment, the decoder equipment 12 sends an audio stream to one or more pieces of audio playback equipment 11a and 11b by using a real-time transport protocol (RTP). Specifically, this protocol provides for the audio stream to be split up into packets and for the header of each packet to include synchronization data in the form of a timestamp field (described in section 5.1 of RFC 3550 associated with said protocol).

In another particular embodiment, the decoder equipment 12 sends an audio stream to one or more pieces of audio playback equipment in the form of an MPEG "transport" stream conveyed in user datagram protocol (UDP) packets, the MPEG "transport" stream also enabling synchronization data (in the form of timestamps) to be associated the various packets.

Furthermore, the synchronization data does not include only timestamp data, but it also includes information that is characteristic of a reference clock. By way of example, this information is correspondence information between the timestamps of the RTP or MPEG headers of the packets and said reference clock. In the present example, the reference clock is the internal clock of the decoder equipment 12.

In addition, the synchronization data also includes the reference clock directly.

For example, the decoder equipment 12 sends directly to the pieces of audio playback equipment 11a and 11b, the following:
  the audio stream in the form of packets by means of an RTP or MPEG protocol;
  its clock using an NTP protocol;
  correspondence information about the correspondence between the timestamp information in the RTP or MPEG headers and said NTP clock.

Optionally, the decoder equipment 12 sends the correspondence information by using a protocol of the RTP control protocol (RTCP) type (RTCP protocol as described in section 6.4.1 of RFC 3550).

In another example, when the appliance 15 communicates with the audio playback equipment 11a, 11b and the decoder equipment 12 using a command protocol, the appliance 15 interrogates the decoder equipment 12 via the command protocol in order to discover correspondence information about the correspondence between the timestamp information and the NTP clock, and then the appliance 15 communicates said correspondence information to the audio playback equipment 11a, 11b using said command protocol. The decoder equipment 12 then sends only the audio stream and its clock directly to the audio playback equipment.

The connection between the decoder equipment 12 and the audio/video playback equipment 13 may be wired or wireless. Any type of technology may be used for providing this connection: optical, radio, etc. The connection may thus be of various different "physical" kinds (e.g. high-definition multimedia interface (HDMI), Toslink, RCA, etc.) and/or it may use various different "computer" protocols (e.g. Bluetooth, UPnP, Airplay, Chromecast, Wi-Fi, etc.).

The connection between the decoder equipment 12 and each piece of audio playback equipment 11a and 11b and used for conveying the audio link is wireless in this example. Any type of technology may be used for providing this connection: optical, radio, etc. The connection can thus use various different "computer" protocols (e.g. Bluetooth, UPnP, Airplay, Chromecast, Wi-Fi, etc.). Alternatively, the connection could be wired, e.g. using an Ethernet protocol.

Thus, and in accordance with a nonlimiting option, the audio/video playback equipment 13 has an HDMI connection 14 with the decoder equipment 12, and the audio playback equipment 11a, 11b is connected via a network local to each piece of audio/video playback equipment 13. By way of example, the local network may be a wireless network of Wi-Fi type. In another variant, the local network includes a Wi-Fi router, the decoder equipment 12 is connected to said Wi-Fi router by a wired connection of Ethernet type or is connected to the router by a wireless connection of Wi-Fi type. Furthermore, and independently of the link between the router and the decoder equipment 12, the pieces of audio playback equipment 11a and 11b may be connected to the Wi-Fi router by wireless connections of Wi-Fi type or by wired connections of Ethernet type.

In the same manner, the appliance 15 communicates with the decoder equipment 12 and with the pieces of audio playback equipment 11a and 11b, preferably by wireless communication. Any type of technology may be used for providing such communication: optical, radio, etc. This communication can thus use various different "computer" protocols (e.g. Bluetooth, UPnP, Airplay, Chromecast, Wi-Fi, etc.). Thus, and in accordance with a nonlimiting option, the appliance 15 is likewise connected via the local network to the decoder equipment 12 and to the various pieces of audio playback equipment 11a and 11b.

There follows a description of how the various pieces of audio playback 11a and 11b equipment in the installation are managed.

Figure 2:
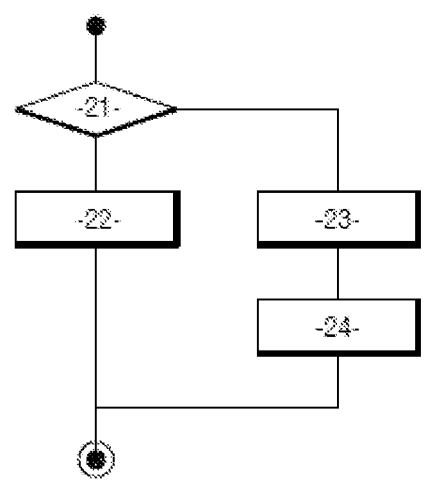
FIG. 2 is a diagram showing the various stages of a first implementation of the invention by the installation shown in FIG. 1.

With reference to FIG. 2, the appliance 15 performs the following stages.

In a stage 21, the appliance 15 determines whether a given audio stream is being played by a single piece of audio playback equipment or by a group comprising a plurality of pieces of audio playback equipment.

As mentioned above, in this example, the appliance 15 acts as a controller for at least one of the pieces of audio playback equipment 11a and 11b. Consequently, the appliance 15 is suitable for associating or dissociating each of the pieces of audio playback equipment 11a and 11b with at least one group in response to actions taken by the user (e.g. via the graphical control interface of the appliance 15). Under such circumstances, the appliance 15 necessarily knows the configuration of the group(s) and the presence and/or the role of each of the pieces of audio playback equipment 11a and 11b within the group(s), so that performing the stage 21 is easy for the appliance 15.

If the audio stream is being played by only one of the pieces of audio playback equipment 11a, then the appliance passes to a stage 22. If the audio stream is being played by the group (i.e. is being played simultaneously by all of the pieces of audio playback equipment 11a and 11b making up said group), the appliance 15 passes to a stage 23.

In stage 22, the appliance 15 sends an order to the piece of audio playback equipment 11a that it is to apply a set of equalization parameters. This set is thus adapted to the fact that the piece of audio playback equipment 11a is playing back the entire audio stream. For example, the appliance 15 may possess a table in memory that describes the set of equalization parameters to be applied by a piece of audio playback equipment that is isolated. Consequently, the appliance 15 reads from said table the parameters that are to be applied by said piece of audio playback equipment and it sends said set of parameters to the piece of audio playback equipment.

In the stage 23, the appliance 15 determines the equalization parameters that are to be applied by each of the pieces of audio playback equipment 11a and 11b. These parameters may be the same for both pieces of audio playback equipment 11a and 11b (e.g. the user has requested the two pieces of audio playback equipment 11a and 11b to be used in stereo), or else they may be different for the two pieces of audio playback equipment 11a and 11b (e.g. if the user has requested one of the pieces of audio playback equipment to be a woofer and the other one to be a mid-range or treble loudspeaker). By way of example, the appliance 15 may possess a table in memory describing the sets of parameters to be applied by each piece of audio playback equipment as a function of the configuration of the group and of the role played by each piece of audio playback equipment within the group. For each piece of audio playback equipment, the appliance 15 reads from said table the parameters that are to be applied by each piece of audio playback equipment.

For this purpose and as mentioned above, the appliance 15 might already know the role of a given piece of audio playback equipment within a given group, and/or it might interrogate said piece of audio playback equipment in order to request its role within that said given group.

During the stage 24, the appliance 15 sends the order to each piece of audio playback equipment 11a and 11b that it is to apply the set of equalization parameters that corresponds to said piece of equipment, as determined during stage 23.

It should thus be understood that the user does not intervene at any moment in defining the parameters that are to be applied by each piece of audio playback equipment 11a and 11b.

It is the appliance 15 that performs this work in compliance with a configuration order that was optionally provided beforehand by the user, this order being general in nature (specifying which piece(s) of equipment is/are to play the audio stream, in a mono or stereo configuration, in the presence of a woofer, a mid-range loudspeaker, a treble loudspeaker . . . ) and thus being easy for the user to give.

The method is thus entirely automatic once the user has specified the configuration with which the audio stream is to be played back. This makes it possible, in a manner that is simple, quick, and effective, to apply one or more sets of parameters to the audio playback equipment or to the group of pieces of audio playback equipment playing the same audio stream.

Furthermore, the method as described and as performed by the appliance 15 enables the pieces of audio playback equipment 11a and 11b to apply the proper equalization parameters automatically without intervention from the user and also without said pieces of audio playback equipment 11a and 11b needing to determine whether they form part of a group or whether they are playing back the audio stream on their own.

Advantageously, the method as described can thus be performed using commercially available pieces of audio playback equipment 11a and 11b without any need to modify them.

In a variant, it is the audio source (and in this example the decoder equipment 12) that performs the various stages shown in FIG. 2.

When it comes to performing the stage 21, the audio stream source is configured, by its very nature, for sending the audio stream to one or more pieces of audio playback equipment. Consequently, the audio source knows whether it is configured to send the audio stream to a single piece of audio playback equipment, and if so it passes to the stage 22, or whether it is configured to send the audio stream simultaneously to a plurality of pieces of audio playback equipment, and if so it passes to the stage 23.

For the stages 22 to 24, the audio source may itself contain the table in memory and/or may interrogate the appliance 15 that itself possesses the table.

For example, since the audio source can be configured to send different portions of an audio stream to different pieces of audio playback equipment, it can thus determine the role that each piece of audio playback equipment is to play within a group as a function of the portion of the audio stream that it sends to that piece and it can thus deduce which set of parameters is to be applied. Alternatively, or in addition, the audio source interrogates each piece of audio playback equipment in order to request its role within a given group and thus deduce which set of parameters is to be applied.

Advantageously, the above-mentioned stages (whether they are performed by the appliance 15 and/or by the audio source) are performed automatically without a measurement step and without intervention by the user (once the user has set up the configuration desired for playing back the audio stream).

Preferably, the above-mentioned stages (whether they are performed by the appliance 15 and/or by the audio source) are performed once again each time the user makes a new request to play back an audio stream and/or each time the user makes a new request to modify the configuration of the installation.

Furthermore, as mentioned above, the synchronization data may pass solely between the decoder equipment 12 and the pieces of audio playback equipment 11a and 11b, or it may pass, at least in part, via the appliance 15. When the appliance 15 not only gives the order for which set(s) of parameters is/are to be applied, but also manages the synchronization of a given audio stream, at least in part, the above-described method may optionally include additional steps as described below with reference to FIG. 3.

Thus, if the user has requested synchronous reading of an audio stream by the two pieces of audio playback equipment 11a and 11b (which pieces are thus grouped together in the same group), the apparatus 15 orders the decoder equipment 12 to send said audio stream to said pieces of audio playback equipment 11a and 11b. Typically, the apparatus 15 sends a command message 310 to the decoder equipment 12 to send the audio stream to the pieces of audio playback equipment 11a and 11b. By way of example, such a message 310 may be sent using JSON-RPC standard.

Figures 4, 5, 6:
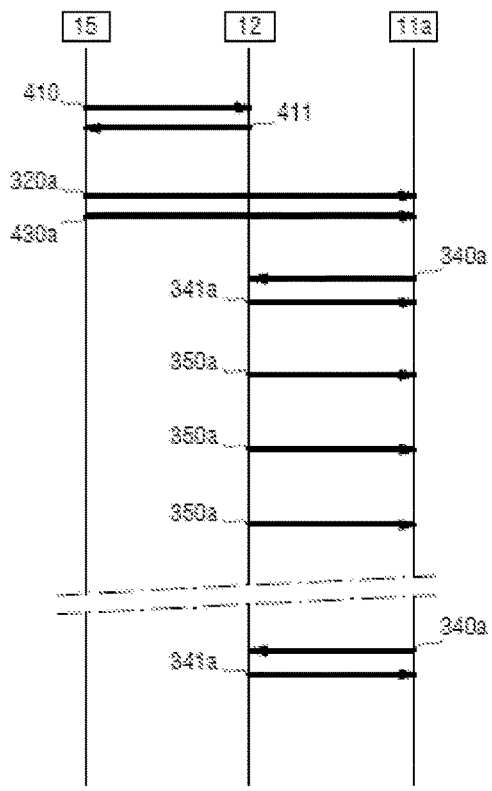
FIG. 4 is a sequence diagram showing messages exchanged during a second application of the implementation shown diagrammatically in FIG. 2.
FIG. 5 is an example of an order to send an audio stream as given to at least one piece of equipment of audio playback equipment in the installation shown in FIG. 1.
FIG. 6 is an example of a notification exchanged between an audio source and an appliance of the installation shown in FIG. 1 following the order to send an audio stream, e.g.

An example of such a message 310 is shown in FIG. 5. The "targets" parameter of such message contains a list of pieces of audio playback equipment to which the audio stream is to be sent by the decoder equipment 12. For each piece of audio playback equipment, this list contains an "address" field that contains the IP address of the piece of audio playback equipment and a "port" field that contains the UDP port on which the audio playback equipment is to receive the stream. The order may contain other parameters, e.g. a uniform resource identifier (URI) specifying the audio stream that is to be sent. Alternatively, the audio stream that is to be sent may be implicit: for example when the decoder equipment 12 is a television decoder, the audio stream that is to be sent may be defined implicitly as being the soundtrack of the video that is being read by the decoder equipment 12.

The decoder equipment 12 then sends its clock to the pieces of audio playback equipment.

In a second step, in response to the message 310, the decoder equipment 12 also sends synchronization data to the appliance 15. Possible examples of such data are given above. For example, the decoder equipment 12 sends a message 311 to the appliance 15 containing correspondence information about the correspondence between the RTP packet timestamp information and the clock of the decoder equipment 12 (NTP type clock).

An example of this message 311 is shown in FIG. 6. The parameters "ref_ntp_time" and "ref_rtp_timestamp" of this message represent the information about the correspondence between the RTP timestamp information and the NTP clock. Specifically, these parameters mean that if a packet contains RTP timestamp information equal to "ref_rtp_timestamp", then the audio data contained in that packet should be played back at the instant specified by "ref_ntp_time". For example, this response also contains an "rtp_clock_rate" field, which defines the rate at which the RTP timestamp information is incremented.

In a third step, in response to the second message 311, the appliance 15 orders:
the first piece of audio playback equipment 11a to play the audio stream sent by the decoder equipment 12 so that it is synchronized on the NTP clock of the decoder equipment 12;
the second piece of audio playback equipment 11b to play the audio stream sent by the decoder equipment 12 so that it is synchronized on the same NTP clock of the decoder equipment 12.

For example, the appliance 15 sends these orders respectively via a message 320a to the first piece of audio playback equipment 11a and a message 320b to the second piece of audio playback equipment 11b. Each of these messages 320a and 320b thus contains the information about the correspondence between the RTP packet timestamp information and the NTP clock of the decoder equipment 12 as recovered by the appliance 15 (information the appliance 15 obtained in the preceding step) so that the pieces of audio playback equipment 11a and 11b can synchronize themselves on the same reference clock (specifically the NTP clock of the decoder equipment).

Figures 7, 8, 9:
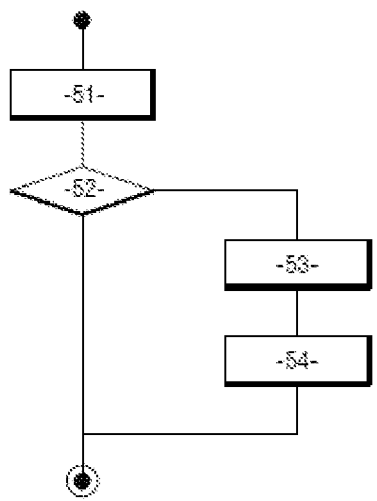
FIG. 7 is an example of an order to play back an audio stream as given to at least one piece of equipment of audio playback equipment in the installation shown in FIG. 1.
FIG. 8 is an example of an order to apply a set of equalization parameters as given to at least one piece of audio playback equipment of the installation shown in FIG. 1.
FIG. 9 is a diagram showing the various stages of a second implementation of the invention by the installation shown in FIG. 1.

An example of the message 320a or 320b is shown in FIG. 7. The parameter "ntp_server" in this message contains the address and the port of the NTP server that supplies the clock on which reading is to be synchronized, and in the present example this address is the address of the decoder equipment 12. The parameters "ref_ntp_time," "ref_rtp_timestamp" and "rtp_clock_rate" are the same as in the message 311 described with reference to FIG. 6.

Furthermore, and in a fourth step, the appliance 15 sends an order to each piece of audio playback equipment 11a and 11b to apply a given set of equalization parameters. This fourth step thus corresponds to the stage 24 as described with reference to FIG. 2. The stage 21 of determining whether to play back the audio stream via a single piece of audio playback equipment or via a group of pieces of audio playback equipment has thus already been performed beforehand (e.g. prior to sending the message 310 or between sending the message 310 and the message 311), and the stage 23 of determining which equalization parameters are to be applied by each piece of audio playback equipment 11a and 11b has also already been performed beforehand (e.g. prior to sending the message 310 or between sending a message 310 and the message 311).

For example, the appliance 15 transmits respective messages 330a and 330b to the pieces of audio playback equipment 11a and 11b, these messages containing the sets of parameters that are to be applied by each of the pieces of equipment.

An example of such a message 330 is given in FIG. 8. The parameters "ref_ntp_time," "mid_gain_db" and "treble_gain_db" in this message represent the gain values to be applied respectively to bass, mid-range, and treble frequencies. In the example shown, the first piece of audio playback equipment 11a is to act as a woofer and consequently the second piece of audio playback equipment 11b is to attenuate bass frequencies strongly.

In a first a variant, the third step and the fourth step are combined. Consequently, a single message containing both the order to apply a given set of equalization parameters and also the order to play the audio stream synchronously with a reference clock is exchanged between the appliance 15 and the first piece of audio equipment 11a and likewise between the appliance 15 and the second piece of audio playback equipment 11b (the messages 320a and 330a are thus combined, as are messages 320b and 330b). By way of example, means for uniting a plurality of orders within a single message are described in section 6 of version 2 of the JSON-RPC standard.

In another variant, the messages 320a and 320b of the third step and the messages 330a and 330b of the fourth step may be sent by distinct appliances 15, or indeed some of the messages may be sent by the appliance 15, while the others are sent by the decoder equipment 12.

In a fifth step, each piece of audio playback equipment 11a and 11b preferably supplies the decoder equipment 12 with an NTP request in compliance with RFC 1305 in order to monitor the synchronization between said pieces of audio playback equipment 11a and 11b.

For example, in response to the message 320a or 320b, the piece of audio playback equipment 11a or 11b sends an NTP request message 340a or 340b in compliance with RFC 1305 to the decoder equipment 12. Advantageously, each of these NTP request messages is repeated regularly. For example, each of these NTP request messages is repeated once per second.

In a sixth step, in response to the message 340a or 340b, the decoder equipment 12 sends an NTP response message 341a or 341b in compliance with RFC 1305 to the piece of audio playback equipment 11a or 11b.

In a seventh step, in response to the message 310 sent by the appliance 15, the decoder equipment 12 sends the audio stream to both pieces of audio playback equipment 11a and 11b, this audio stream carrying synchronization data of the timestamp type. For example, the decoder equipment 12 sends RTP messages 350a or 350b in compliance with RFC 3550 to the loudspeaker 11a or 11b, these messages containing both the audio stream that is to be played back and the associated timestamp, as mentioned above.

In a variant, the decoder equipment 12 may send the audio stream earlier (potentially by RTP messages) and may do so as soon as it has received the message 310, even though the two pieces of audio playback equipment have not synchronized their clocks with the reference clock. Under such circumstances, either the pieces of audio playback equipment ignore the messages so long as their clocks are not synchronized with the reference clock, or else they can serve the messages until their clocks are synchronized with the reference clock and they then ignore messages that are obsolete (i.e. messages where the timestamp has passed).

Figure 3:
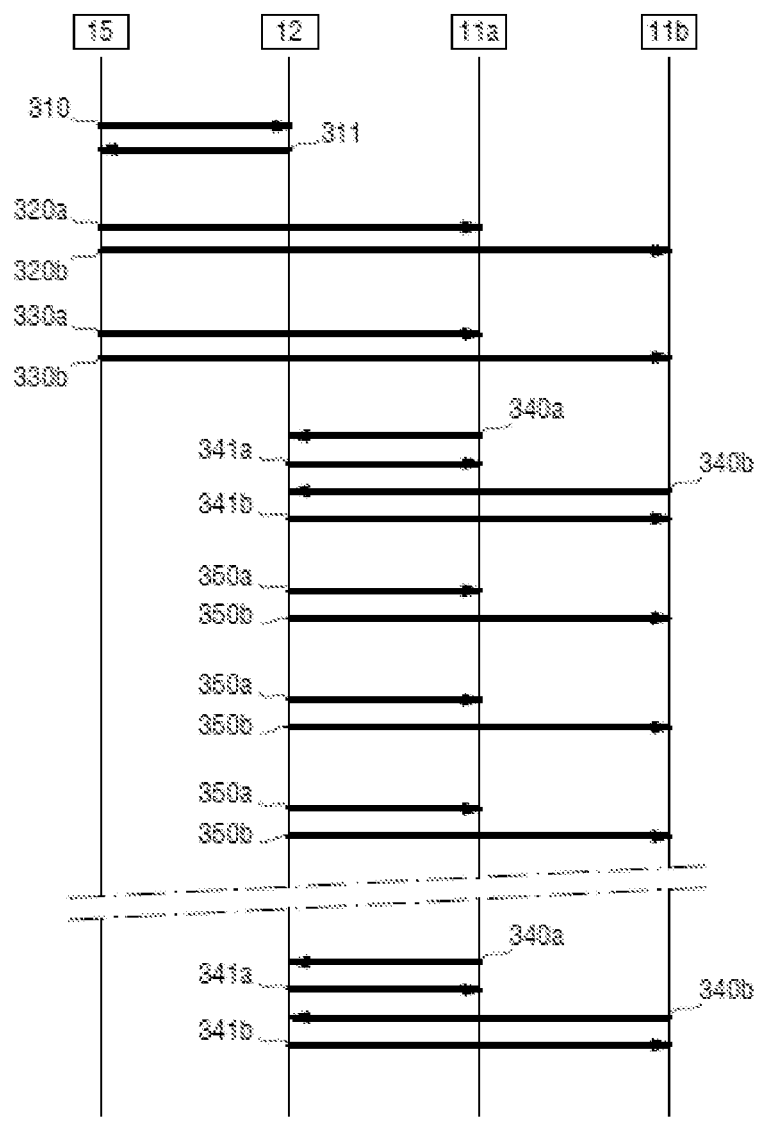
FIG. 3 is a sequence diagram showing messages exchanged during a first application of the implementation shown diagrammatically in FIG. 2.

The steps described with reference to FIG. 3 are a particular implementation of the invention. Specifically, there is no need to have recourse to the appliance 15 for managing synchronization, which can thus be managed solely by the audio source (the decoder equipment 12 in this example), with the appliance 15 then serving only to manage the application of the sets of parameters.

In a variant, it is the audio source (in this example the decoder equipment 12) that performs the various steps described above with reference to FIG. 3, both for applying the sets of parameters and for managing synchronization.

Furthermore, when the appliance 15 orders not only the application of one or more sets of parameters but also manages the synchronization of a given audio stream, at least in part, and when the audio stream is played back by a single piece of audio playback equipment (e.g. if the audio stream being read by said piece of audio playback equipment is to be synchronized with a video stream), then the above-described method may optionally include additional steps, as described below with reference to FIG. 4.

The appliance 15 sends a message 410 to the decoder equipment 12. This message 410 contains a command requesting the decoder equipment 12 to send an audio stream to the piece of audio playback equipment 11a.

In response to the message 410, the decoder equipment 12 sends a message 411 to the appliance 15, which message contains information about the correspondence between the timestamp information of the RTP packets and the NTP clock of the decoder equipment 12.

The appliance 15 also sends a message 430a to the piece of audio playback equipment 11a. This message 430a contains a command requesting the piece of audio playback equipment 11a to apply a certain set of equalization parameters. This message has the same format as the message 330a or 330b sent for synchronized reading by two pieces of audio playback equipment 11a and 11b, but contains values that are appropriate for playback by a single loudspeaker. By way of example, and with reference to the message shown in FIG. 8, the value of the "bass_gain_db" parameter contained in the message 430 is set at 0 for playback by a single piece of audio playback equipment 11a.

The other messages that are exchanged are identical both for playback by a single piece of audio playback equipment 11a (as shown in FIG. 4) and for playback by a plurality of pieces of audio playback equipment 11a 11b(as shown in FIG. 3). In particular, the messages received and sent by the first piece of audio playback equipment 11a are identical in both modes of operation. Thus, for the mode of operation with a single piece of audio playback equipment 11a, the message 320a (for synchronizing of a reference clock) and the message 430 can be combined in a single message containing both commands, providing the command protocol allows for this.

With reference to FIG. 9, there follows a description of a second particular implementation of the invention.

In this second implementation, the appliance 15 is not involved in ordering the application of sets of equalization parameters. In contrast, this function is performed by each piece of audio playback equipment 11a and 11b in turn, such that each piece of audio playback equipment 11a and 11b causes the other pieces of audio playback equipment in the same group to apply one or more given sets of equalization parameters, but without applying the order to itself.

During an initialization stage 51, the first piece of audio playback equipment 11a applies equalization parameters that are appropriate for operation on its own in isolation. These parameters are predefined and not subject to being determined by said piece of audio playback equipment 11a.

In a stage 52, the piece of audio playback equipment 11a determines whether it is isolated (i.e. whether it is playing back a given audio stream on its own) or whether it is part of a group of a plurality of pieces of audio playback equipment 11a and 11b (i.e. a plurality of pieces of audio playback equipment 11a and 11b that play back the same audio stream simultaneously).

If the piece of audio playback equipment 11a determines that it is part of a group, then in stage 53, the piece of audio playback equipment 11a determines the equalization parameters that are to be applied by the other pieces of audio playback equipment of the group, not including itself (i.e. in this example only the piece of audio playback equipment 11b).

Thereafter, in a stage 54, the piece of audio playback equipment 11a sends an order to each other piece of audio playback equipment in the group (in this example only the piece of audio playback equipment 11b) to apply the set(s) of equalization parameters as determined in stage 53.

It should thus be understood that in this implementation, each piece of audio playback equipment determines the set(s) of parameters to be applied by the other pieces of audio playback equipment in the group, but it does not determine the set of parameters for itself.

Specifically, it is the or each other piece of audio playback equipment in the group that determines the set of parameters suitable for application by the first piece of audio playback equipment in the group. Specifically, in this second implementation, all of the pieces of audio playback equipment apply the above stages in turn (it is thus possible to envisage that the stage 21 is not performed by a piece of audio playback equipment if it has already received an order to apply a given set of parameters as a result of a stage 24 being performed by another piece of audio playback equipment in an earlier stage).

Naturally, the invention is not limited to the implementations and embodiments described above, and variants may be provided without going beyond the ambit of the invention.

Thus, although above, the decoder equipment is a decoder box, the decoder equipment could be any other equipment capable of performing audio decoding, such as an audio/video decoder, a digital video decoder, and for example it could be a games console, a computer, a smart TV, a digital tablet, a mobile telephone, a digital television decoder, a set-top box, etc. In general manner, although above the audio source is decoder equipment, the audio source can be any other equipment capable of supplying an audio stream to the pieces of audio playback equipment, such as a digital hi-fi system.

Although above the audio source and the appliance are distinct, the source and the appliance could form portions of the same unit. In a variant, the appliance could be incorporated in the audio source, e.g. incorporated in decoder equipment. In another variant, the audio source could be incorporated in the appliance. Thus, it could be the appliance that delivers an audio stream directed to at least one of the pieces of audio playback equipment. Thus, by way of example, the audio source could be incorporated in an appliance of mobile telephone and/or tablet type, the appliance performing both the "audio source" function and also the "audio playback equipment management" function by means of appropriate applications. There might be two distinct applications, one performing the "audio playback equipment management" function and the other performing the "audio source" function, or else both functions may be performed by a single application that combines both functions. Thus, the device that determines the sets of parameters that are to be applied and that orders application of said sets could be directly an audio source (or a piece of audio playback equipment as described with reference to FIG. 8) and not a distinct appliance. The appliance could be different from that described above, but it is preferably an appliance that is movable relative to the various pieces of audio playback equipment so as to be easy for a user to operate (in particular while going from one room to another). The appliance should then be of a size and a weight that enable a user to move it on its own by carrying it and that enable the user to operate said appliance without necessarily needing to put it down on a support.

Although above the audio source is distinct from all of the pieces of audio playback equipment, the audio source and at least one of the pieces of audio playback equipment need not be distinct and could form portions of the same unit. This would apply for example if the piece(s) of audio playback equipment directly process(es) audio streams coming from an external network of Internet type. It would thus be possible to have one or more pieces of audio playback equipment constituting smart pieces of audio playback equipment (such as "smartspeakers"), thus being capable of operating without the decoder equipment since they incorporate directly the ability to access the audio source, with such pieces of equipment playing an audio stream directly whether coming from an external network of Internet type or coming from a local network. This could also apply if the audio source itself includes the loudspeakers (e.g. the audio source is decoder equipment including loudspeakers). Although above the appliance is distinct from all of the pieces of audio playback equipment, the appliance and at least one of the pieces of audio playback equipment need not be distinct and could form portions of the same unit. Preferably, the appliance is not a loudspeaker and it is not incorporated in such a loudspeaker.

Under all circumstances, none of the pieces of audio playback equipment determines the parameters that are to be applied by itself (this being done either by another piece of equipment or by the audio source or by the appliance)

It would thus be possible in a single unit to have at least an appliance, a piece of audio playback equipment, and an audio source, which would then not be distinct.

The installation could equally well have a plurality of audio sources and/or a plurality of appliances, it being understood that the audio sources, the appliances, and the pieces of audio playback equipment could be coupled together in one or more units.

Although above the appliance is a mobile telephone, the appliance could be any other element provided with or connected to a graphics control interface. The appliance could thus be of various different kinds: a dedicated appliance, a mobile telephone or a tablet executing a dedicated application, a computer executing a dedicated application, or some other appliance (games console, digital television decoder, smart TV, . . . ) operating in dedicated manner or executing a dedicated application.

Furthermore, although above the audio playback equipment is an external smartspeaker, it could be any other equipment having a loudspeaker, e.g. a loudspeaker other than a smartspeaker, a sound bar, an audio system connected to a Wi-Fi/audio bridge, . . . .

Although above the pieces of audio playback equipment are connected to the audio source by a wireless network of Wi-Fi type, the pieces of audio playback equipment could be connected to the audio source in some other way, e.g. by a wired network of Ethernet type, or by a wireless connection of Bluetooth type, or by any other connection means suitable for conveying audio data, and preferably synchronization data.

The numbers of pieces of audio playback equipment and/or of pieces of source equipment and/or of appliances could be other than described above.

The various connections mentioned could be wired instead of being wireless.

Orders may be sent from the appliance to the pieces of audio playback equipment either directly or else indirectly, passing via the audio source. Orders may also be sent from the audio source to the pieces of audio playback equipment either directly or else indirectly, passing via the appliance.

Use could be made of protocols other than those mentioned. For example, use could be made of one or more of the PTP, SPD, RTCP, RTP, . . . protocols for synchronizing the pieces of audio playback equipment and/or the streams conveyed in the installation. Although proposals are made above for one of the pieces of audio playback equipment to act as a woofer and for the second piece of audio playback equipment consequently to attenuate bass frequencies strongly, the equalization parameters need not necessarily be limited to three bands. Thus, equalization can be performed on any number of bands greater than or equal to 2 (e.g., and in nonlimiting manner: treble, mid-range, base). The equalization parameters could also include cut-off frequency values that mark the boundaries between the bands. The pieces of audio playback equipment could also contain memory zones storing a plurality of sets of equalization parameters in association with identifiers, the message 330 then containing merely the identifier of the set of parameters that is to be applied.

Although above the synchronization data comprises both data associated with the timestamp and data associated with the correspondence between the timestamp and the reference clock, it is possible to envisage the synchronization data comprising solely information about the reference clock (e.g. a timestamp that corresponds directly to the reference clock). Although above the reference clock is the internal clock of the audio source, the reference clock could be different, and for example it could be a clock external to the installation, such as a public server on the Internet.

When synchronizing on an NTP server, it could thus be a public server on the Internet or else it could be directly the internal clock of the audio source. In both situations, the pieces of audio playback equipment could thus send NTP requests to the server in question.

Furthermore, the internal clock of the decoder equipment could differ depending on the origin of the stream. For example, if the audio stream comes from an incoming video on demand (VOD) stream or if the audio stream comes from a stream stored on the hard disk of the decoder equipment, then the decoder equipment clock would be free and would come directly from its quartz crystal. In contrast, if the audio stream comes from an incoming TV stream (of satellite, cable, or DTT type), the decoder equipment clock should be servocontrolled on the broadcast clock using the PCR fields of the MPEG standard.

It is possible to envisage that the above description of synchronizing the pieces of audio playback equipment applies equally to the video playback equipment (or the audio/video playback equipment). Naturally, most of the packets will have timestamp information other than ref_rtp_timestamp, but the correspondence information makes it possible to calculate the NTP time at which any packet is to be played back by using the following formula:

$$ntp\_time = ref\_ntp\_time + (rtp\_timestamp - ref\_rtp\_timestamp)/rtp\_clock\_rate$$

It is also possible that additional unit conversions will need to be performed, for example if ref_ntp_time is expressed in nanoseconds while rtp_clock_rate is expressed in kHz (as applies to FIG. 6).

Naturally, the various embodiments, implementations, options, . . . described above may be combined with one another.

The invention claimed is:

1. An installation comprising a device and at least one piece of audio playback equipment, the device being configured to determine whether an audio stream is played back in the installation by only one piece of audio playback equipment or by a group of at least two pieces of audio playback equipment, the device being distinct from said pieces of audio playback equipment, the device also being configured:
   if the device detects that the audio stream is played back by a single piece of audio playback equipment, to generate an order for said piece of equipment to apply a given set of equalization parameters;
   if the device detects that the audio stream is played back by a group of at least two pieces of audio playback equipment, to determine the equalization parameters to be applied by each piece of audio playback equipment of said group, and to generate a respective order for each piece of audio playback equipment of said group to apply a respective given set of equalization parameters,
   the pieces of audio playback equipment applying the equalization parameters without intervention from an user and also without said pieces of audio playback equipment needing to determine whether they form part of a group or whether they are playing back the audio stream on their own.

2. The installation according to claim 1, comprising an audio source configured for sending the audio stream to one of the pieces of audio playback equipment and/or to a mobile appliance that is mobile relative to the pieces of audio playback equipment.

3. The installation according to claim 2, wherein the device is the audio source and/or the mobile appliance.

4. The installation according to claim 2, wherein audio source is distinct from the device, the device controlling simultaneously the audio source and the piece(s) of audio playback equipment of the installation.

5. The installation according to claim 2, wherein when the installation includes the audio source, the audio source is distinct from the pieces of audio playback equipment of the installation, and when the installation includes the appliance, the appliance is distinct from the pieces of audio playback equipment of the installation.

6. The installation according to claim 2, wherein the appliance is a mobile telephone or a tablet.

7. A method of applying at least one set of equalization parameters, performed by an installation comprising a device and at least one piece of audio playback equipment, the device being configured to determine whether an audio stream is played back in the installation by only one piece of audio playback equipment or by a group of at least two pieces of audio playback equipment, the device being distinct from said pieces of audio playback equipment, the device also being configured:
   if the device detects that the audio stream is played back by a single piece of audio playback equipment, to generate an order for said piece of equipment to apply a given set of equalization parameters;
   if the device detects that the audio stream is played back by a group of at least two pieces of audio playback equipment, to determine the equalization parameters to be applied by each piece of audio playback equipment of said group, and to generate a respective order for each piece of audio playback equipment of said group to apply a respective given set of equalization parameters,
   the pieces of audio playback equipment applying the equalization parameters without intervention from an user and also without said pieces of audio playback equipment needing to determine whether they form part of a group or whether they are playing back the audio stream on their own.

8. The method according to claim 7, including a synchronization step for synchronizing playback of the audio stream on a reference clock.

9. The method according to claim 8, wherein the synchronization step is performed by means of synchronization data.

10. The method according to claim 9, wherein the audio stream is split up into packets and the header of each packet includes timestamp information, the synchronization data being correspondence information about the correspondence between at least said timestamp information and the reference clock.

11. The method according to claim 7, wherein the device contributes to synchronizing the playback of the audio stream on a reference clock.

12. The method according to claim 11, wherein the device orders one or more of the pieces of audio playback equipment to play the audio stream in a manner that is synchronized on the reference clock.

13. The method according to claim 12, wherein the order to play the audio stream in a manner that is synchronized on the reference clock is transmitted via a second message that is different from a first message containing the order to apply a given set of equalization parameters.

14. The method according to claim 13, wherein, once the order to play the audio stream in a manner that is synchronized on the reference clock has been transmitted, the piece(s) of audio playback equipment deliver at least one NTP request to an audio source of the installation.

15. The method according to claim 14, wherein the piece(s) of audio playback equipment deliver(s) periodically at least one NTP request to the audio source.

16. The method according to claim 7, wherein if the audio stream is played by a group of at least two pieces of audio playback equipment, the device causes a set of different parameters to be applied by each piece of audio playback equipment in the group.

17. A device of an installation for performing the method according to claim 7.

18. A non-transitory computer readable storage medium storing a computer program including instructions that cause a device to execute the method according to claim 7.

* * * * *